US006089909A

United States Patent [19]

Tokuwa

[11] Patent Number: 6,089,909

[45] Date of Patent: Jul. 18, 2000

[54] CONNECTOR

[75] Inventor: Koichiro Tokuwa, Yokkaichi, Japan

[73] Assignee: Sumitomo Wiring Systems, Ltd., Japan

[21] Appl. No.: 09/086,137

[22] Filed: May 28, 1998

[30] Foreign Application Priority Data

Jun. 2, 1997 [JP] Japan .................................... 9-143844

[51] Int. Cl.[7] ........................................................ H02B 1/01

[52] U.S. Cl. ............................................ 439/557; 439/552

[58] Field of Search .................................... 439/557, 556, 439/548, 549, 553, 555, 559, 562, 567, 571, 552, 544, 558, 563, 569, 572, 573

[56] References Cited

U.S. PATENT DOCUMENTS

| | | | |
|---|---|---|---|
| 3,366,729 | 1/1968 | Pauza | 174/138 R |
| 3,523,269 | 8/1970 | Witek, Jr. et al. | 439/358 |
| 3,790,923 | 2/1974 | Mathe | 439/557 |
| 4,840,584 | 6/1989 | Cox | 439/538 |
| 5,002,497 | 3/1991 | Plocek et al. | 439/248 |
| 5,372,523 | 12/1994 | Sakatani et al. | 439/552 |
| 5,613,876 | 3/1997 | Sakatani et al. | 439/552 |
| 5,752,856 | 5/1998 | Boutin et al. | 439/621 |
| 5,779,500 | 7/1998 | Tokuwa et al. | 439/557 |
| 5,800,208 | 9/1998 | Ishizuka et al. | 439/557 |
| 5,813,880 | 9/1998 | Kodama | 439/364 |
| 5,836,787 | 11/1998 | Kodama | 439/567 |

*Primary Examiner*—Gary F. Paumen
*Assistant Examiner*—Ross Gushi
*Attorney, Agent, or Firm*—Anthony J. Casella; Gerald E. Hespos; Michael J. Porco

[57] ABSTRACT

A connector is provided for mounting to a panel without any shake regardless of the thickness of the panel. The connector includes a housing 1 is held in its oblique position and a fixed first lock groove 10 at the upper side of the housing 1 is engaged with an upper side edge of a mount hole 5 formed in a panel. Thereafter, the housing 1 is rotated to its horizontal position, and a movable second lock groove 16 at the lower side of the housing 1 is engaged with a lower side edge of the mount hole 5 while an elastic portion 12 is elastically deformed. In this way, the housing 1 is mounted on the panel. At the respective lock grooves 10, 16, elastic pushing portions 18, 20 obliquely project from a jaw portion 7 which forms one side surface of each of the lock grooves 10, 16. The elastic pushing portions 18, 20 elastically hold the upper and lower edges of the mount hole 5 in cooperation with projections 8 and a projected portion 15 of an elastic portion 12 by undergoing a small degree of elastic deformation in the case of a thinner panel P2 while undergoing a large degree of elastic deformation in the case of a thicker panel P1, i.e. by changing a degree of elastic deformation according to the thickness of the panel.

13 Claims, 5 Drawing Sheets

CONNECTOR

BACKGROUND OF THE INVENTION

1. Field of the Invention

The present invention relates to a connector to be mounted on a panel.

2. Description of the Prior Art

The prior art includes connectors that can be mounted on a panel of, for example, an automotive vehicle. Japanese Unexamined Utility Model Publication No. 5-94969 discloses one such known connector. This prior art connector is constructed such that a receptacle fittable into a mount hole formed in a panel is formed at one end of a connector housing. The receptacle is formed in one surface thereof with a first lock groove engageable with the edge of the mount hole at one side. The opposite surface thereof has an elastic portion in which a second groove is formed. The second groove is engageable with the edge of the mount hole on the opposite side. After the first lock groove is engaged with the edge of the mount hole, and with the housing held obliquely with respect to the panel, the housing is rotated to a straight position and the second lock groove is engaged with the edge of the mount hole at the opposite side by elastically deforming the elastic portion. In this way, the prior art connector can easily and quickly be mounted on the panel.

The thickness of the panels on which the connector is to be mounted differs depending on the type of the vehicle (for example, 0.65 to 1.40 mm). There are some cases where the use of common connectors is required. In such a case, the width of the lock grooves needs to conform to the thickness of the thickest panel. Accordingly, in the case that the connector is mounted on a thinner panel, it shakes, is mounted while being inclined and, in an extreme case, comes out of the mount hole.

The present invention was developed in view of the above problem, and an object thereof is to securely mount a connector so as not to shake or rattle regardless of the thickness of a panel on which the connector is mounted.

SUMMARY OF THE INVENTION

According to the invention, there is provided a connector, comprising a housing formed on at least one outer surface thereof with a first lock groove engageable with the edge of a mount hole formed in a panel. On another, and preferably the substantially opposite outer surface thereof, the connector is provided with an elastic portion in which a second lock groove is formed. The second lock groove is engageable with the edge of the mount hole. At least one of the lock grooves is provided with at least one elastic pushing portion bulging at least partially into the corresponding lock groove.

The elastic pushing portion elastically holds or can hold the edge of the mount hole in cooperation with the side wall of the lock groove by changing a degree of elastic deformation according to the thickness of the panel. Accordingly, the connector can be mounted in a proper position without any shake regardless of the thickness of the panel.

According to a preferred embodiment of the invention, after the first lock groove is engaged with the edge of the mount hole the second lock groove is engageable with the edge of the mount hole at the other, preferably substantially opposite side while the elastic portion is elastically deformed.

Preferably, the at least one elastic pushing portion bulges substantially in the widthwise direction of the corresponding lock groove and/or in an insertion direction of the connector into the panel.

The at least one elastic pushing portion may be formed by bending one side surface of the lock groove. The elastic pushing portion formed by bending one side wall of the lock groove elastically holds or can elastically hold the edge of the mount hole in cooperation with the side wall of the lock groove at the opposite side while being elastically deformed.

Most preferably, at least one escape groove or hole is formed corresponding to the at least one elastic pushing portion. The at least one elastic pushing portion is bent from or formed at the front edge of the ceiling surface of the corresponding escape groove or hole to project substantially obliquely into the corresponding lock groove.

According to a further preferred embodiment, the elastic pushing portion is provided only at the second lock groove of the elastic portion.

In the case that the connector is disengaged from the panel, it is more likely caused by the disengagement of the second lock groove of the elastic portion from the mount hole upon being subjected to an external force. Accordingly, if the elastic pushing force is provided on only one of the lock grooves, it is provided on the second lock groove which is more likely to be disengaged. Therefore, the disengagement of the connector can be prevented effectively.

Preferably, the elastic portion is formed substantially by slits formed in the housing substantially along the longitudinal direction thereof.

Further preferably, the width of the at least one lock groove is set to be greater than the thickness of the edge of the mount hole formed in the panel. Additionally, a distance between the at least one elastic pushing portion and the corresponding substantially opposite side wall of the lock groove is set to be shorter or smaller than the thickness of the edge of the mount hole.

Still further preferably, the elastic pushing portion changes or varies a degree of its elastic deformation according to the thickness of the edge of a mount hole.

Most preferably, the second lock groove is integrally or unitarily formed on the outer surface of the elastic portion.

These and other objects, features and advantages of the present invention will become more apparent upon a reading of the following detailed description and accompanying drawings.

DETAILED DESCRIPTION OF THE PREFERRED EMBODIMENT

A male connector M in accordance with this embodiment is illustrated in FIGS. 1–5. This connector M includes a connector housing 1 integrally or unitarily made e.g. of a synthetic resin material. The connector housing 1 is constructed such that a substantially rectangular receptacle 3 is formed at a front end of a main body 2 preferably in the form of a substantially rectangular parallelepipedic block. Unillustrated male terminal fittings are inserted or insertable into terminal cavities formed in the main body 2 preferably from the rear surface to be accommodated therein while tabs thereof project into the receptacle 3. An unillustrated mating female connector housing is fitted or fittable into the receptacle 3 to engageably connect the corresponding male and female terminal fittings.

The receptacle 3 of the housing 1 is fittably mounted or mountable into a mount hole 5 formed in a panel P as shown in FIG. 3. Accordingly, the mount hole 5 of the panel P has a corresponding, preferably substantially rectangular shape.

Figure 2:
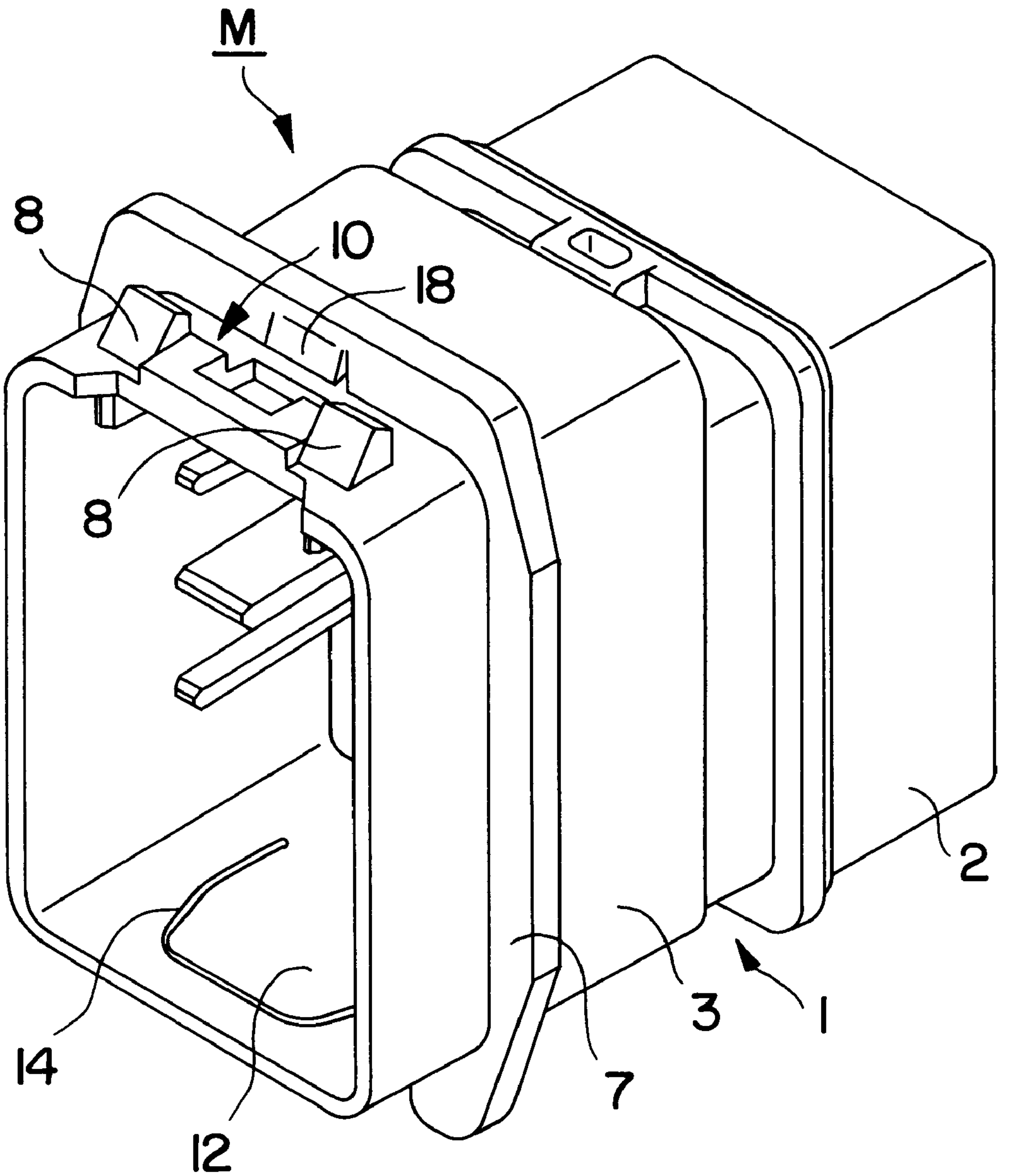
FIG. 2 is a perspective view of the connector housing when viewed from above.

On the outer surface of the receptacle 3 is formed a jaw portion 7 which extends substantially over the entire circumference in a position a specified distance away or spaced from the front edge of the receptacle 3. On one outer surface along the shorter side of the receptacle 3 are formed a pair of left and right projections 8 as shown in FIG. 2. Specifically, the projections 8 are formed in positions a specified distance before or in front of the jaw portion 7. A clearance between the projections 8 and the jaw portion 7 defines the width of a first lock groove 10 and the width of this groove 10 is set preferably slightly larger than the thickness of a thicker panel P1 (see FIG. 4).

Figure 1:
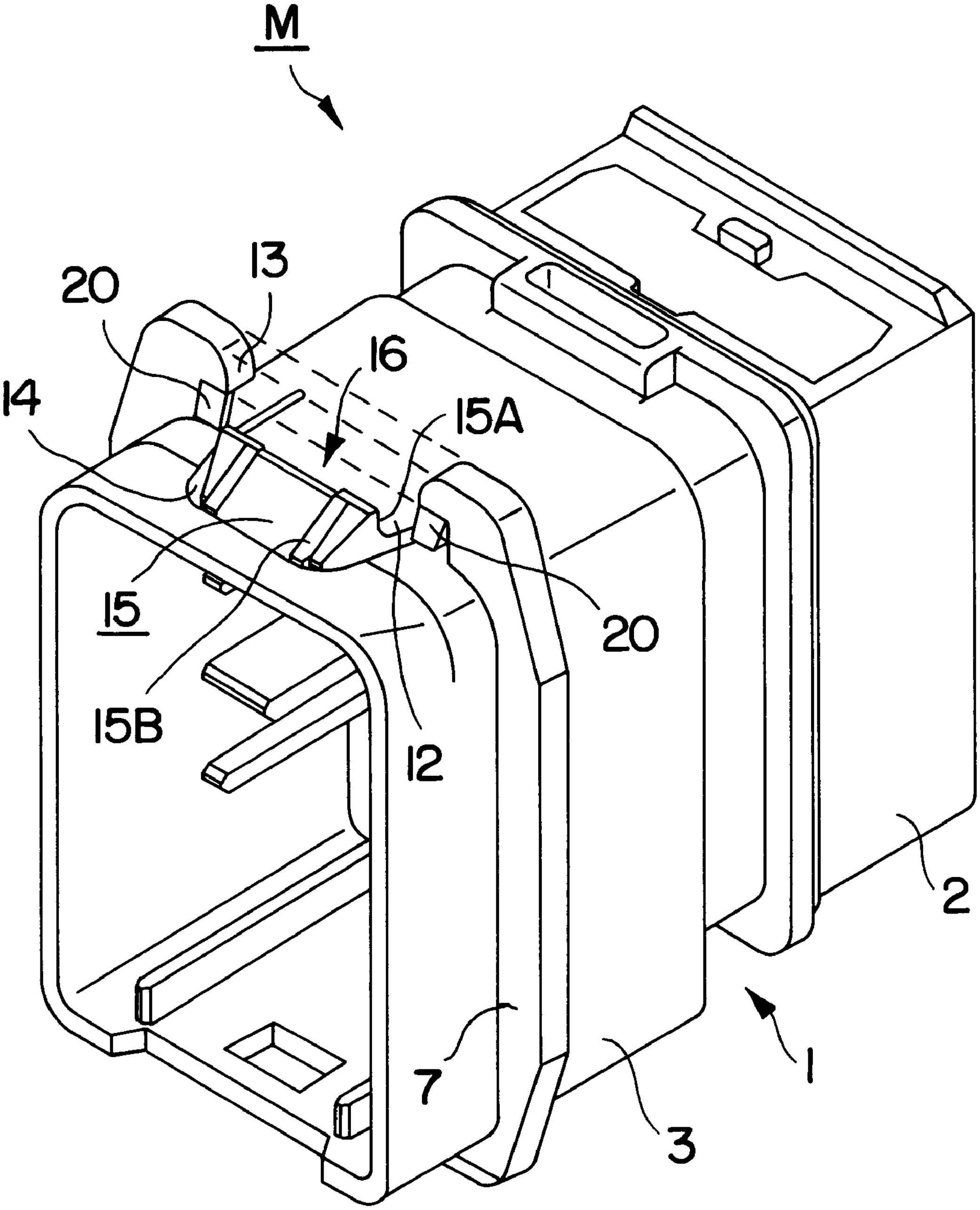
FIG. 1 is a perspective view of a connector housing according to one embodiment of the invention when viewed from below.

On the other hand, an elastic portion 12 is formed on one surface of the receptacle 3 substantially opposite from the one where the projections 8 are formed. Specifically, as shown in FIG. 1, a notch 13 is formed in the jaw portion 7. The elastic portion 12 extends forwardly or towards the opening of the receptacle 3, and is formed, for example, by making a slit 14 between the opposite ends of the notch 13. This elastic portion 12 is such that its leading end is deformable inwardly. A projected portion 15 is formed on the outer surface of the leading end of the elastic portion 12. The rear surface of the projected portion 15 is a substantially vertical surface 15A and the front surface thereof is a guide surface 15B which is inclined downwardly or towards the receptacle 3 to the front.

A clearance between the vertical surface 15A of the projected portion 15 of the elastic portion 12 and the jaw portion 7 corresponds to the width of a second lock groove 16, and the width thereof is set substantially equal to that of the first lock groove 10.

Figure 5:
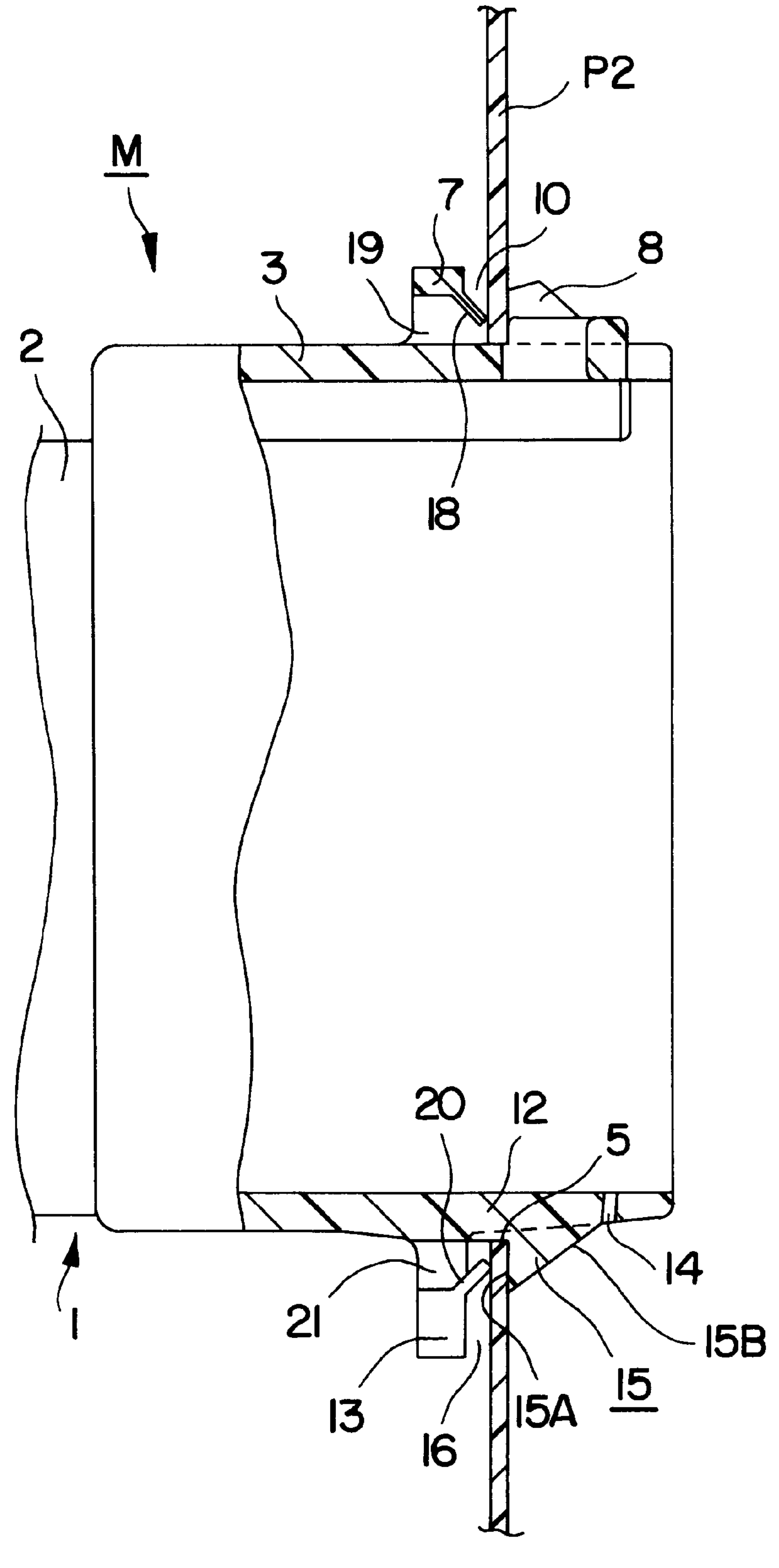
FIG. 5 is a partial enlarged section in the case that the connector housing is mounted on a thinner panel.

In a portion of the receptacle 3 where the first lock groove 10 is substantially formed, a first elastic pushing portion 18 is provided substantially in a middle portion of the jaw portion 7 along the widthwise direction thereof as shown in FIG. 2. Specifically, as shown in FIG. 5, an escape hole 19 is formed inside the jaw portion 7, and the first elastic pushing portion 18 is bent from or formed at the front edge of the ceiling surface of the escape hole 19 to project obliquely forwardly or in a direction toward the projections 8 along the longitudinal direction of the connector housing 1 or the widthwise direction of the first lock groove 10 or an insertion direction of the connector into the panel or in a direction arranged at an angle different from 0° or 180° with respect to the panel, when the connector is mounted therein. A distance between the first elastic pushing portion 18 and the projections 8 is so set as to be slightly shorter than the thickness of a thinner panel P2 (see FIG. 5). The first elastic pushing portion 18 is deformable toward the escape hole 19.

On the other hand, in a portion of the receptacle 3 where the second lock groove 16 is formed or adjacent thereto, preferably a pair of left and right second elastic pushing portions 20 are provided as shown in FIG. 1. Specifically, escape grooves 21 are formed inside end portions of the jaw portion 7 at or adjacent to the notch 13 (see FIG. 5). The second elastic pushing portions 20 preferably are bent or curved or formed at the front ends of the ceiling surfaces of the respective escape grooves 21 so as to extend obliquely forwardly. A distance between the leading ends of the respective elastic pushing portions 20 and the vertical surface 15A of the projected portion 15 of the elastic portion 12 preferably is set slightly smaller than the thickness of a thinner panel P2 (FIG. 5). The second elastic pushing portions 20 are deformable toward the escape grooves 21 or in a direction towards and/or away from the projected portion 15. The projected portion 15 may be formed in a bridge-like shape (not shown) and/or the jaw portion 7 may be formed in a bridge-like shape in a position corresponding to the projected portion 15 (dashed lines in FIG. 1).

Figure 3A:
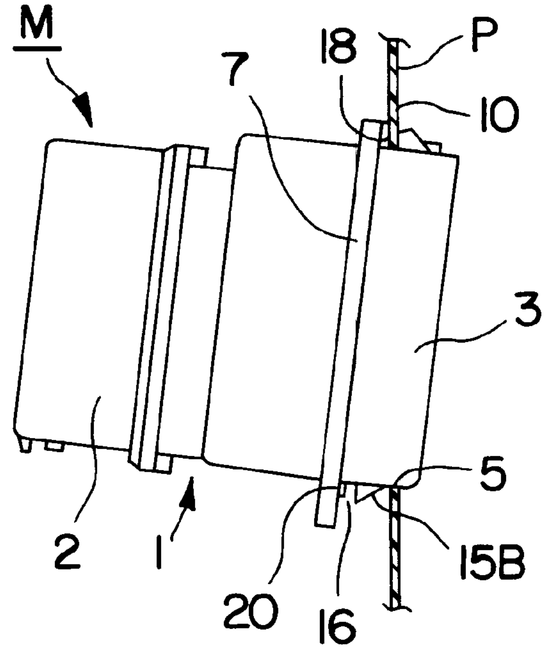
FIGS. 3(A) and 3(B) are sections showing an operation of mounting a connector housing on a panel.
Figure 3B:
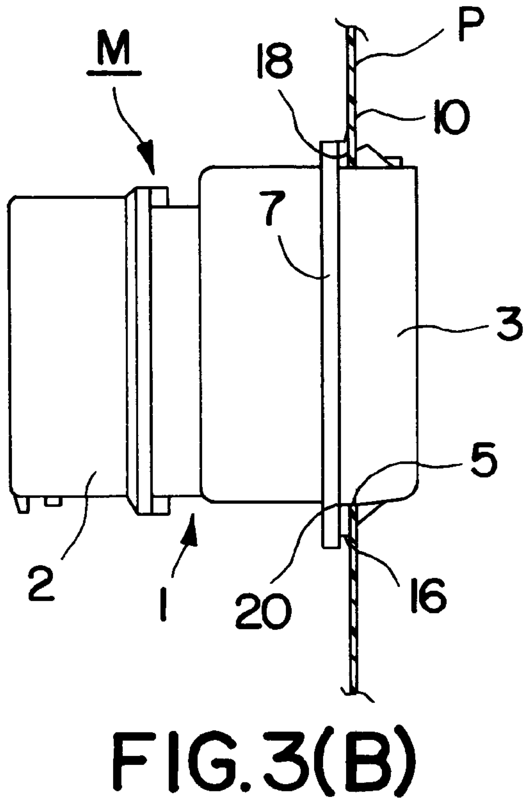

The connector housing 1 is mounted on the panel P in the following procedure. First, as shown in FIG. 3(A), the receptacle 3 is inserted into the mount hole 5 of the panel P with the housing 1 obliquely held, and the first lock groove 10 at the fixed side is engaged with the upper side edge of the mount hole 5. Subsequently, the receptacle 3 is further inserted while the housing 1 is rotated to a horizontal position or a position at an angle different from 0° or 180°, preferably substantially normal to the panel P. Then, since the guide surface 15B of the elastic portion 12 comes substantially into contact with the lower side edge of the mount hole 5, the receptacle 3 is inserted while the elastic portion 12 is elastically deformed inwardly. When the housing 1 is held in its horizontal position, the guide surface 15B passes the lower side edge of the mount hole 5. Accordingly, as shown in FIG. 3(B), the second lock groove 16 is engaged with the lower side edge of the mount hole 5 while the elastic portion 12 is restored substantially to its original position.

Figure 4:
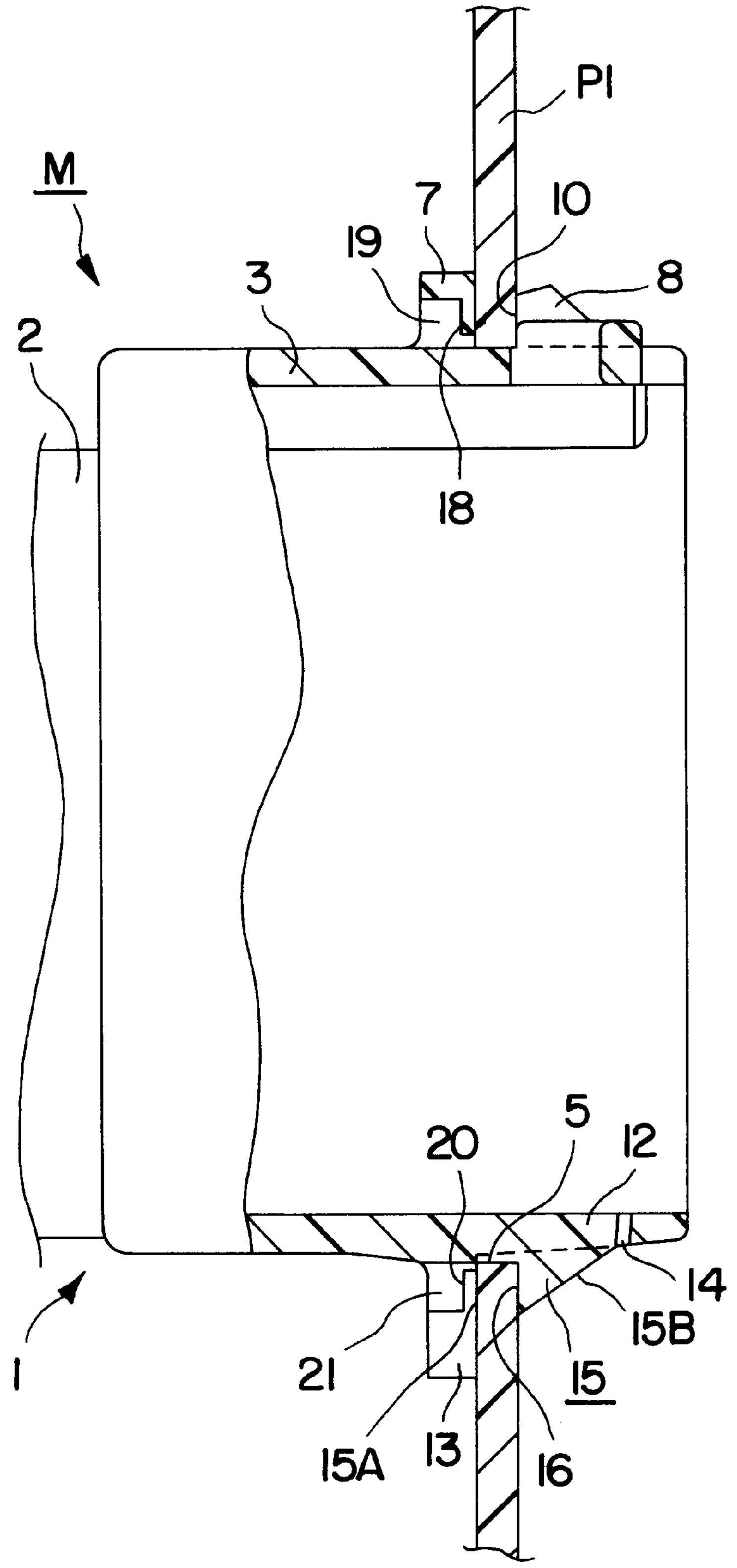
FIG. 4 is a partial enlarged section in the case that the connector housing is mounted on a thicker panel.

During th is mounting, the first and second elastic pushing portions 18, 20 also are deformed elastically. For example, in the case of the thicker panel P1, the first and second elastic pushing portions 18, 20 are deformed elastically toward the escape grooves 19, 21 to a large degree as shown in FIG. 4. The first elastic pushing portion 18 elastically holds the upper side edge of the mount hole 5 in cooperation with the projections 8 due to its elastic restoring force. On the other hand, the pair of second elastic pushing portions 20 elastically hold or position the lower side edge of the mount hole 5 in cooperation with the vertical surface 15A of the projected portion 15 of the elastic portion 12 due to their elastic restoring forces.

In the case of the thinner panel P2, the first and second elastic pushing portions 18, 20 are deformed elastically to a smaller degree as shown in FIG. 5, but display their elastic restoring forces. Similar to the other case, the first elastic pushing portion 18 elastically holds or positions the upper side edge of the mount hole 5 in cooperation with the projections 8 and the pair of the second elastic pushing portions 20 substantially elastically hold or position the lower side edge of the mount hole 5 in cooperation with the vertical surface 15A of the projected portion 15 of the elastic portion 12.

As described above, according to this embodiment, the first and second elastic pushing portions 18, 20 elastically hold the upper and lower side edges of the mount hole 5 in cooperation with the projections 8 and/or the projected portion 15 of the elastic portion 12 which act as the side walls of the lock grooves 10, 16 while the degree of deformation thereof is substantially changed according to the thickness of the panel P. Thus, regardless of the thickness of the panel P, the connector M can be mounted in a proper position without any shake.

The present invention is not limited to the described and illustrated embodiments. For example, the following embodiments are embraced by the technical scope of the present invention as defined in the claims. Besides the following embodiments, a variety of changes can be made without departing the spirit and scope of the present invention as defined in the claims.

The elastic pushing portion may be provided only on either one of the fixed first lock groove side and the movable second lock groove side.

In the above case, the second lock groove formed in the elastic portion is more likely to come out of the mount hole while the elastic portion is deformed upon being subjected to an external force. Thus, it is more effective to form the elastic pushing portion at the second lock groove side.

The invention is applicable to connectors in general which are mounted not only on panels of automotive vehicles, but also on other panels.

What is claimed is:

1. A connector for mounting to a panel, said panel having opposed first and second panel surfaces defining a panel thickness and a mount hole extending through said panel from said first panel surface to said second panel surface, said mount hole having a specified size and shape, said connector comprising:

a housing having opposed first and second ends and a plurality of outer surfaces extending between said ends, at least one jaw portion projecting outwardly from said outer surfaces and defining a cross-section larger than said mount hole, portions of said outer surfaces between said jaw portion and said first end defining a cross-section smaller than the mount hole such that portions of said outer surfaces between said first end and said jaw portion permit insertion of said connector housing into said mount hole, such that said jaw portion limits movements of said connector housing through said mount hole, at least one projection extending from at least one said outer surface at a location between said jaw portion and said first end of said connector housing to define a first lock groove with a width not less than the panel thickness, an elastic portion formed on said housing at a location spaced from said projection, said elastic portion having a projected portion disposed between said jaw portion and said first end of said housing and projecting outwardly from said outer surfaces to define a second lock groove with a width not less than the panel thickness, said elastic portion being deflectable inwardly to a position where the projected portion lies within the cross-section defined by the outer surfaces, at least one elastic pushing portion formed at a location on said jaw portion spaced from said outer surfaces and projecting inwardly toward at least one of said outer surfaces into at least one of said first and second lock grooves, said elastic pushing portion, in an unbiased condition, defining an effective groove thickness less than the panel thickness and being sufficiently deflectable toward said jaw portion to define an effective groove thickness substantially equal to the panel thickness, whereby said elastic pushing portion enables secure gripping of said connector to said panel at said mount hole.

2. A connector according to claim 1, wherein the elastic pushing portion is only provided at the second lock groove of the elastic portion.

3. A connector according to claim 1, wherein the elastic portion is formed by a pair of longitudinal slits formed in the housing and extending substantially along a direction extending between the ends of the housing, each of the longitudinal slits having a first end between the jaw portion and the first end of the housing and a second end between the jaw portion and the second end of the housing, said elastic portion further being formed by a transverse slit extending between the first ends of the longitudinal slits, the elastic portion having a first end formed by the transverse slit, the projected portion of the elastic portion including a tapered guide surface tapered outwardly and extending from the transverse slit to the second lock groove, portions of the tapered guide surface adjacent the transverse slit substantially conforming to the cross-section of the outer surfaces adjacent the transverse slit for facilitating insertion of the first end of the housing into the mount hole.

4. A connector according to claim 1, wherein the elastic pushing portion has a free end, the projected portion of the elastic portion and the projection each extending from the outer surfaces of the housing further than the free end of the elastic pushing portion.

5. A connector according to claim 4, wherein the at least one elastic pushing portion comprises first and second elastic pushing portions disposed respectively on opposite respective sides of said elastic portion.

6. A connector according to claim 1, wherein the at least one elastic pushing portion is formed unitarily with the jaw portion.

7. A connector according to claim 6, wherein at least one hole is formed at a location aligned with the at least one elastic pushing portion, and wherein the at least one elastic pushing portion is formed in its unbiased condition to project substantially obliquely into the corresponding lock groove.

8. A connector according to claim 5, wherein the at least one projection comprises a pair of spaced apart projections, the connector further comprising a third elastic pushing portion disposed to engage said panel at a location substantially symmetrically between locations on the panel engaged by the projections.

9. A connector according to claim 8, wherein the first end of the housing defines a substantially continuous peripheral edge, said elastic portion being disposed between said continuous peripheral edge and said jaw portion.

10. A connector for mounting to a panel, said panel having opposed first and second panel surfaces defining a panel thickness and a mount hole extending through said panel from said first panel surface to said second panel surface, said mount hole having a specified size and shape, said connector comprising:

a housing having opposite first and second ends and a plurality of housing walls extending between said first and second ends, portions of said walls adjacent said first end defining a substantially continuous edge extending around said housing, at least one jaw portion projecting outwardly from said side walls of said housing at a location spaced from said first end, said jaw portion defining a cross-section larger than said mount hole, said walls of said housing defining a plurality of outer surfaces between said first end and said jaw portion, said outer surfaces defining a cross-section smaller than the mount hole for permitting portions of said housing between said jaw portion and said first end to be inserted into said mount hole, at least one projection extending from at least one of said outer surfaces at a location between said jaw portion and said first end of said connector housing to define a first lock groove with a maximum width not less than the panel thickness, an elastic portion formed on said housing at a location spaced from said first and second ends, said elastic portion having a projected portion between said first end of said connector housing and said jaw portion to define a second lock groove with a maximum width not less than the panel thickness, said elastic portion being deflectable inwardly to a position where the projected portion lies within the cross-section defined by the outer surfaces, at least first and second elastic pushing portions formed on said jaw portion and projecting obliquely inwardly toward at least one of said outer surfaces of said housing and respectively into said first and second lock grooves, said elastic pushing portions, in unbiased conditions, defining an effective groove width that is less than the panel thickness and being sufficiently deflectable toward said jaw portion to define an actual groove thickness substantially equal to the panel thickness, whereby said elastic pushing portions enable secure gripping of said connector to said panel at said mount hole.

11. A connector according to claim 10, wherein said first elastic pushing portion is disposed to engage said panel at a location in proximity to said at least one projection, said first elastic pushing portion having a free end, said projection projecting from said outer surfaces further than the free end of the first elastic pushing portion.

12. A connector according to claim 10, further comprising a third elastic pushing portion, said second and third elastic pushing portions being disposed respectively on opposite sides of said elastic portion.

13. A connector according to claim 12, wherein the elastic pushing portion has a free end, the projected portion of the elastic portion projecting from the outer surfaces of the housing beyond the free end of the elastic pushing portion.

* * * * *